(12) United States Patent
Rick

(10) Patent No.: US 8,474,863 B2
(45) Date of Patent: Jul. 2, 2013

(54) SIDE AIRBAG SYSTEM, BACKREST AND HEADREST

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 12/741,816

(22) PCT Filed: Oct. 1, 2008

(86) PCT No.: PCT/EP2008/008312
§ 371 (c)(1), (2), (4) Date: May 6, 2010

(87) PCT Pub. No.: WO2009/068131
PCT Pub. Date: Jun. 4, 2009

(65) Prior Publication Data
US 2010/0253052 A1    Oct. 7, 2010

(30) Foreign Application Priority Data
Nov. 26, 2007    (DE) .......................... 10 2007 056 848

(51) Int. Cl.
*B60R 21/231*    (2006.01)
*B60R 21/233*    (2006.01)

(52) U.S. Cl.
USPC ...................... 280/730.2; 280/743.1; 280/729

(58) Field of Classification Search
USPC .................................. 280/730.2, 743.1, 729
IPC ......... B60R 21/22; B60R 21/231; B60R 21/233
See application file for complete search history.

(56) References Cited

U.S. PATENT DOCUMENTS

| 3,598,159 | A | * | 8/1971 | MacIntyre | 139/384 R |
| 3,731,949 | A | * | 5/1973 | Radke | 280/743.1 |
| 5,439,247 | A | * | 8/1995 | Kolb | 280/730.2 |
| 5,496,061 | A | * | 3/1996 | Brown | 280/730.2 |
| 5,566,977 | A | * | 10/1996 | Wipasuramonton | 280/743.1 |
| 5,722,685 | A | * | 3/1998 | Eyrainer | 280/730.2 |

(Continued)

FOREIGN PATENT DOCUMENTS

| DE | 19620537 A1 | 12/1996 |
| DE | 19816075 A1 | 10/1999 |

(Continued)

OTHER PUBLICATIONS

UK Intellectual Property Office, British Office Action dated Dec. 13, 2011 for GB Application No. 1005190.2.

(Continued)

*Primary Examiner* — Ruth Ilan
(74) *Attorney, Agent, or Firm* — Ingrassia Fisher & Lorenz, P.C.

(57) ABSTRACT

A side airbag system is provided with a side airbag for protecting the upper thorax and head area of a vehicle passenger between a lateral vehicle structure and the vehicle passenger, and with a gas generator that is fluidically connected with the side airbag. The side airbag is planar in the deployed condition, and protectively covers a path of motion for the head, along with various seated positions for small and large vehicle passengers. In order to realize an expanded protective potential for the head in semi-convertibles and compact cars, the side airbag, viewed from the lateral vehicle structure, has an outer contour with an essentially continuous bead.

16 Claims, 4 Drawing Sheets

U.S. PATENT DOCUMENTS

| | | | |
|---|---|---|---|
| 5,730,464 A * | 3/1998 | Hill | 280/743.2 |
| 5,806,881 A * | 9/1998 | Richter et al. | 280/730.2 |
| 6,308,983 B1 | 10/2001 | Sinnhuber | |
| 6,349,964 B1 | 2/2002 | Acker et al. | |
| 6,398,253 B1 * | 6/2002 | Heigl | 280/729 |
| 6,520,534 B2 * | 2/2003 | Ritter | 280/730.2 |
| 6,540,253 B2 * | 4/2003 | Acker et al. | 280/730.2 |
| 7,290,791 B2 | 11/2007 | Tracht | |
| 7,311,325 B2 | 12/2007 | Tracht et al. | |
| 7,322,597 B2 | 1/2008 | Tracht | |
| 7,334,811 B2 | 2/2008 | Tracht et al. | |
| 7,377,548 B2 | 5/2008 | Bauer et al. | |
| 7,661,702 B2 * | 2/2010 | Ochiai et al. | 280/730.2 |
| 7,819,423 B2 * | 10/2010 | Loibl et al. | 280/730.2 |
| 7,832,759 B2 * | 11/2010 | Henricsson et al. | 280/729 |
| 2004/0164528 A1 * | 8/2004 | Boegge et al. | 280/730.2 |
| 2005/0206138 A1 * | 9/2005 | Breuninger et al. | 280/729 |
| 2006/0131847 A1 * | 6/2006 | Sato et al. | 280/730.2 |

FOREIGN PATENT DOCUMENTS

| | | |
|---|---|---|
| DE | 19930157 A1 | 1/2001 |
| DE | 102004031865 A1 | 2/2006 |
| DE | 102005057413 A1 | 6/2006 |
| DE | 102005057417 A1 | 6/2006 |
| DE | 102005057443 A1 | 6/2006 |
| DE | 102005057504 A1 | 6/2006 |
| DE | 10200500976 A1 | 9/2006 |
| DE | 102006021510 A1 | 11/2006 |
| DE | 102005050935 A1 | 5/2007 |
| EP | 2292477 A1 | 3/2011 |
| JP | 2000-85515 A * | 3/2000 |
| JP | 2001-158319 A * | 6/2001 |
| JP | 2003-237526 A * | 8/2003 |
| JP | 200710637 A | 4/2007 |
| WO | WO 2006/037536 A1 * | 4/2006 |
| WO | WO 2007/065650 A2 * | 6/2007 |

OTHER PUBLICATIONS

International Searching Authority, International Search Report for Application No. PCT/EP2008/008312, dated Oct. 6, 2009.

Chinese Office Action, Chinese Office Action for Application No. 200880117902.6, dated Sep. 14, 2011.

* cited by examiner

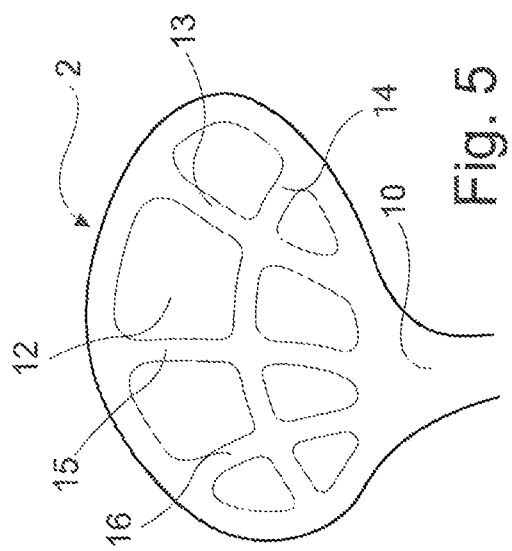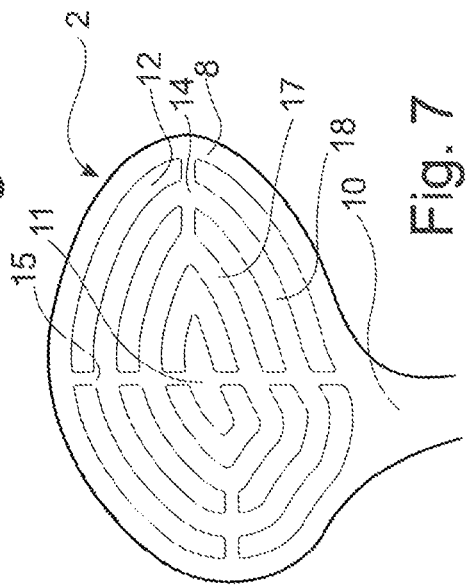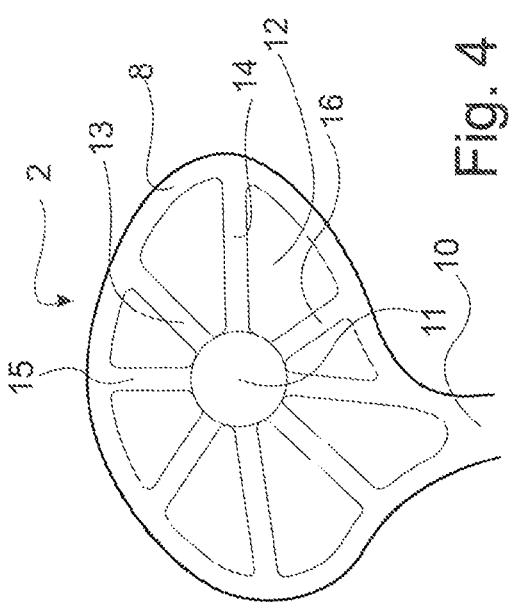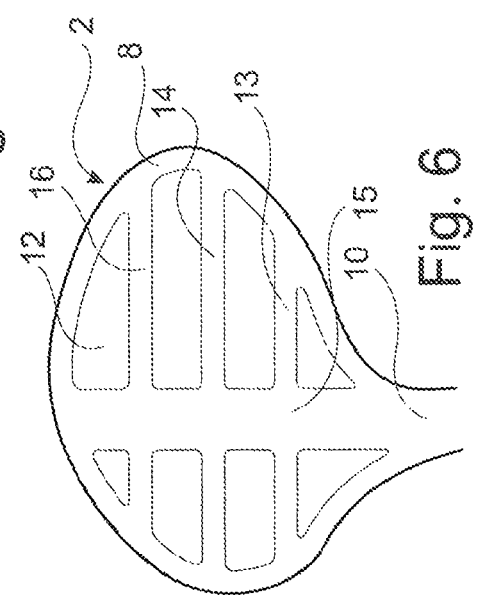

SIDE AIRBAG SYSTEM, BACKREST AND HEADREST

CROSS-REFERENCE TO RELATED APPLICATIONS

This application is a U.S. National-Stage entry under 35 U.S.C. §371 based on International Application No. PCT/EP2008/008312, filed Oct. 1, 2008, which was published under PCT Article 21(2) and which claims priority to German Application No. 102007056848.9, filed Nov. 26, 2007, which are all hereby incorporated in their entirety by reference.

TECHNICAL FIELD

The invention relates to a side airbag system with a side airbag for protecting the upper thorax and head area of a vehicle passenger between a lateral vehicle structure and the vehicle passenger, and with a gas generator that is fluidically connected with the side airbag, wherein the side airbag is planar in the deployed condition, and protectively covers a path of motion for the head, along with various seated positions for small and large vehicle passengers. The invention further relates to a headrest and a backrest.

BACKGROUND

Known in the art is to provide side airbag systems with an integrated headrest. Such side airbag systems are known primarily for semi-convertibles, in which the structural design precludes any roof frames for the attachment and integration of separate headrest systems.

Also known in the art is to accommodate a side airbag laterally in a backrest of a front vehicle seat. However, installation conditions only make it possible to realize a head protection chamber of limited size. The protective potential is here usually designed for a barrier penetrating at a right angle, and for people of average size (50% dummy). Outside of this size window, this type of side airbag represents only a compromise, especially in a semi-convertible. In addition, the protective effect is diminished once the vehicle passenger leaves the normal seated position, for example when bending forward. In vehicles with a closed vehicle cabin, a separate head protector is attached to the roof pillar. While this head protector offers optimal protection given its conception and integration in the lateral roof area, it is extremely expensive, so that such systems are incorporated in only a handful of motor vehicles. In addition, the following prior art is known.

DE 10 2005 050 935 A1 describes a side impact protection device in a motor vehicle with an airbag having two chambers, which are arranged in the lateral paneling of a motor vehicle door or in a seatback. In the deployed condition, the first chamber covers a window section at least partially, in particular a majority of the window section, and extends above and below the window parapet of a vehicle door, and the second chamber extends only in the thorax area between the vehicle passenger and motor vehicle structure. The first chamber has pipes aligned in a vertical direction to increase stiffness.

DE 10 2004 031 865 A1 describes a side airbag module for a vehicle seat having a rebound strap to control the airbag during the deployment process.

At least one object of the invention is to provide a side airbag system of the kind mentioned at the outset with the simplest possible design that saves on installation space, and offers an expanded head protection potential. In addition, other objects, desirable features, and characteristics will become apparent from the subsequent summary and detailed description, and the appended claims, taken in conjunction with the accompanying drawings and this background.

SUMMARY

The at least one object, other objects, desirable features or characteristics, are achieved by virtue of the fact that the side airbag, viewed from the lateral vehicle structure, has an outer contour with an essentially continuous bead. The advantage to the continuous bead is that it creates an outer border for the side airbag that yields an optimized, large lateral surface with improved buffer effect. The head of small and large vehicle passengers alike can be reliably held in the lateral surface within a path of motion of the head. The side airbag thereby provides an optimized side protection potential when inflated, along with a minimized volume when refracted. As opposed to a curtain airbag, the side airbag is particularly easy on resources and saves on materials, making it cost effective to realize.

Therefore, the side airbag is clearly larger in design by comparison to conventional head airbags. As a result of its enlarged lateral surface, the side airbag according to the invention achieves a level of protection similar to that of so-called curtain airbags, or also as airbags referred to as complete systems.

In order to bring about an improved retention function of the head inside the protective area of the airbag while at the same time preventing the head from sliding out of the protective area of the side airbag, the side airbag is preferably shaped like a plate or bowl toward the passenger compartment. Therefore, when viewed from the top and in cross section, a side airbag has a centrally depressed surface and surfaces projecting toward the outer peripheral edge, which extend into the vehicle interior.

In another preferred embodiment, the side airbag is corrugated viewed from the top and in cross section, in particular with a defined, preferably centrally arranged support surface on and toward the vehicle structure. A corrugated, planar structure of the side airbag stabilizes the side airbag toward the outer vehicle structure, thereby providing an additional buffering surface.

In another preferred embodiment, the side airbag is shaped like an M, V and/or W viewed from the top in cross section. The M, V or W shape is here very long and stretched out on the lateral vehicle structure, and exhibits the outer bead according to an embodiment of the invention on the outer peripheral edge.

In an embodiment that further develops the invention, the side airbag is designed like a large egg or potato lying on its side, with a side inflation channel, so as to optimize material and save costs in the design as much as possible. The side airbag is shaped in this way so that the side airbag protects the head area with the vehicle passenger seated normally, bent forward and bent backward.

In order to impart a planar, stable structure to the side airbag, the side airbag preferably has inflatable, tubular gas channels, which viewed superficially are designed to resemble as stars, crosses, double crosses, clams, fans, hammers, kidneys, mushrooms, shovels and/or spades or multiple rings. This reduces the inflation volume, so that a large area is deployed in a short period of time, while simultaneously protecting a maximum region of the head area and preferably also at least part of an upper thorax area of the vehicle passenger.

Since the head represents the largest volume and largest weight to be protected, the side airbag is preferably provided with an essentially constant thickness in the central region, in particular thickened in the main position of the head.

In another preferred embodiment, the side airbag system is secured on the A-, B- and/or C-column or behind the passenger compartment paneling of the corresponding column, depending on the vehicle model, whether it be a semi-convertible or closed-body vehicle.

In the closed-body vehicle, the side airbag system can alternatively be mounted on a roof frame of the roof structure. The advantage to the side airbag system according to the invention with respect to a curtain airbag is that the side airbag material is optimized in design, and hence realized to have an optimized weight and be cost-effective.

In another alternative embodiment, the side airbag system can be mounted on a window parapet in the interior door paneling. The advantage to this type of solution is that it can be used both in semi-convertibles and in vehicles with a rigid roof structure.

In another preferred embodiment, the side airbag system can be incorporated into a backrest of the vehicle seat, wherein the side airbag can exit a side of the backrest facing the vehicle structure during deployment. The advantage to this is that the side airbag also shifts when the seat position is adjusted, so that it can be further optimized in terms of size, as opposed to a fixed curtain airbag.

In another preferred embodiment, the side airbag system is incorporated into a headrest of a vehicle seat. The advantage to this is that the side airbag can deploy in proximity to the head, and have an optimized size. A side airbag system arranged in the headrest also moves when adjusting the seat, and takes up minimal installation space and material when folded and deployed.

In another preferred embodiment, a weight-optimized side airbag system is realized by designing the side airbag system as a soft cover variant. The soft cover variant essentially comprises the gas generator and the folded air sack or airbag. The soft cover variant consists of a packet structure with flexible sheathing. A separate, rigid casing is hence not necessary. The modular soft cover variant is geometrically flexible and saves on installation space.

A backrest is also provided for a vehicle seat of a vehicle having a side airbag system with the features described above, wherein in particular the side airbag system is arranged over the entire or upper height of the backrest, preferably of a front vehicle seat.

In an alternative embodiment, a headrest is provided for a vehicle with a side airbag system described above, wherein in particular the side airbag system covers the entire height of the headrest, and is especially preferably arranged on a front vehicle seat. Front vehicle seats are especially susceptible to lateral impact, and hence merit preferential protection.

It is understood that the features mentioned above and yet to be explained below can be used not just in the respectively indicated combination, but also in other combinations.

BRIEF DESCRIPTION OF THE DRAWINGS

The present invention will hereinafter be described in conjunction with the following drawing figures, wherein like numerals denote like elements, and:

FIGS. 4-7 are various structures of a side airbag system according to embodiments of the invention, and FIG. 8 schematically illustrates the side airbag system mounted on various vehicle components in accordance to embodiments of the invention.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
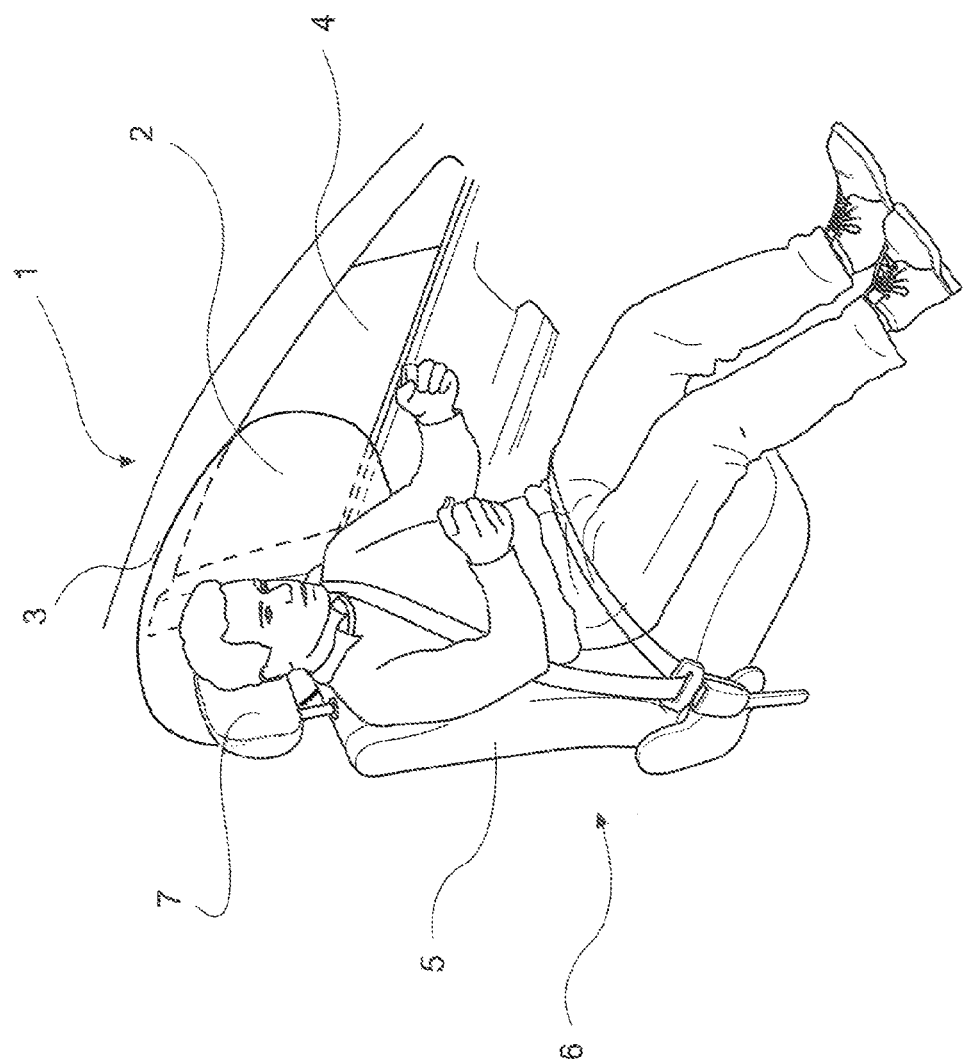
FIG. 1 is a perspective view of the side airbag system according to an embodiment of the invention.

FIG. 1 shows a perspective view of the side airbag system 1 according to an embodiment of the invention with an inflated side airbag 2 according to an embodiment of the invention, which is shaped like an egg or potato lying on its side. The side airbag 2 rests in the upper thorax and head area of a depicted vehicle passenger. The side airbag is deployed between a lateral vehicle structure 3 forming an outer hull and the vehicle passenger. The side airbag 2 is planar in design, and protects a path of motion of the head, including the upper shoulder/chest area, i.e., the thorax area, of the motor vehicle for both small and large vehicle passengers (5%-95% dummy). The protective area of the side airbag 2 is not only rated for so-called 50% dummies, but rather encompasses small to very large body sizes, and absorbs the impact energy in different bodily poses and positions, not just in the main position. FIG. 1 shows the vehicle passengers in a normal vehicle position. It is especially preferred that the side airbag system 1 be arranged in the backrest 5 of the vehicle seat 6 (see also FIG. 8). The side airbag 2 can deploy through correspondingly prefabricated holes or hole paths from the side of the backrest 5 facing the vehicle structure 3 in the case of a vehicular accident.

In an alternative embodiment, the side airbag 2 is accommodated in a headrest 7 (see also FIG. 8), and deploys from a lateral surface of the headrest 7 facing the vehicle structure 3.

Figure 8:
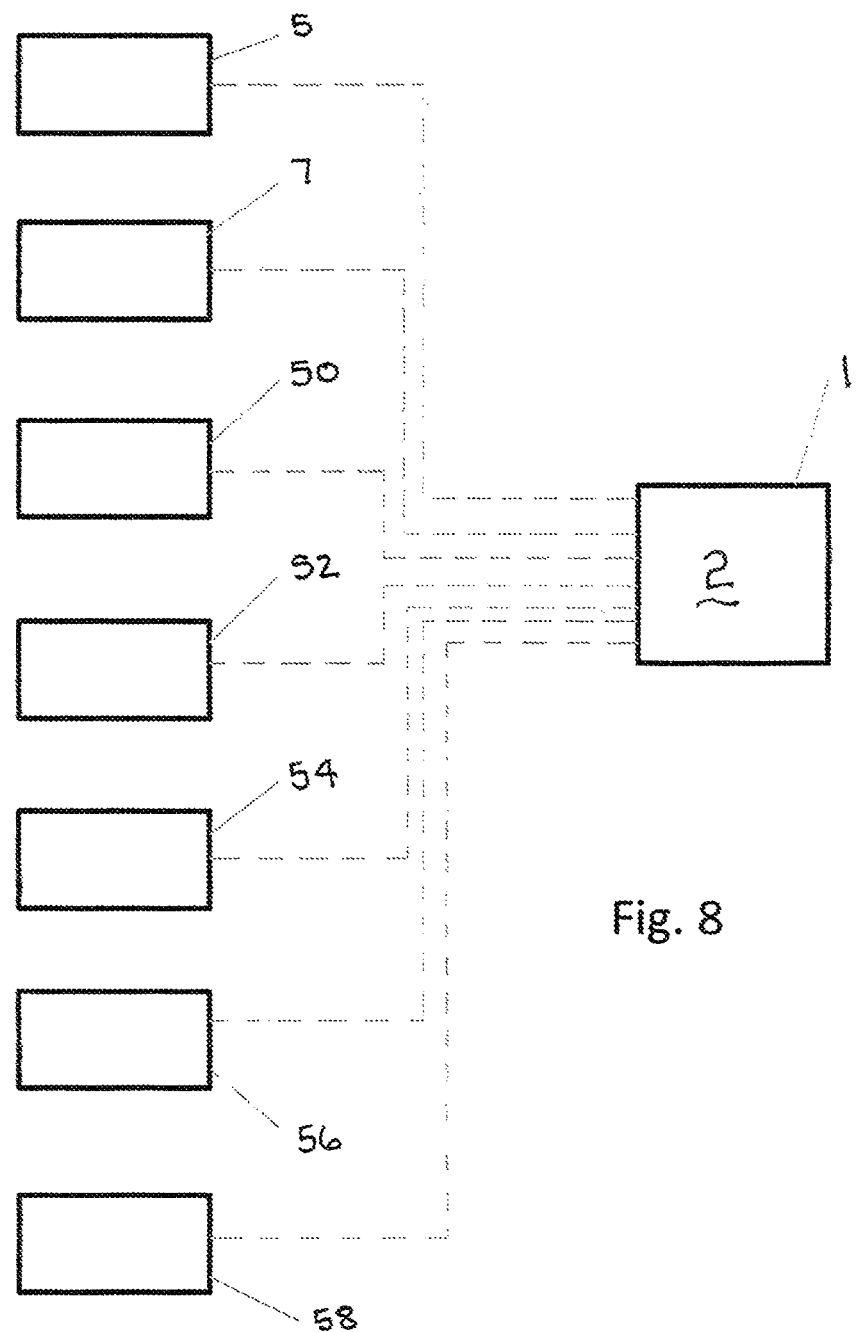

Depending on the application, the side airbag system 1 can also be incorporated on the window parapet (window parapet 50 as illustrated in FIG. 8) of a side window 4 or in the roof structure (roof structure 52 as illustrated in FIG. 8). On a roof frame, or alternatively on the A-, B- and/or C-column (A-column 54, B-column 56, and/or C-column 58 as illustrated in FIG. 8).

Figures 2, 3:
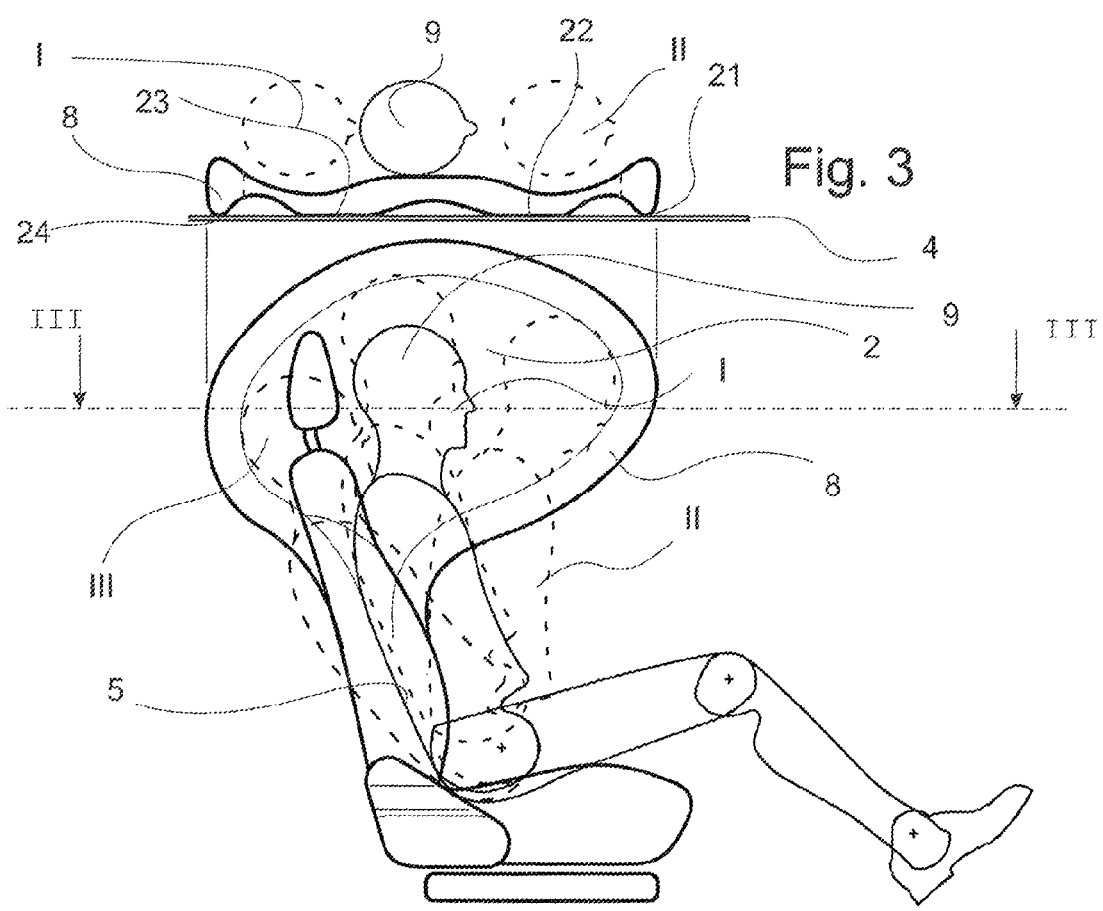
FIG. 2 is a side view of a side airbag system according to an embodiment of the invention.
FIG. 3 is a top view of a side airbag system according to an embodiment of the invention.

FIG. 2 shows a side view of an inflated side airbag 2. A vehicle passenger of normal size and in a normal position I is depicted. The dashed line shows a vehicle passenger bent forward in position II and bent backward in position III. Position IV depicts a large vehicle passenger with an elevated head area.

All positions I to IV are encompassed by the side airbag 2, since the outer contour of the side airbag 2 is designed with a continuous bead 8 that envelops it, as s shown in the side view on FIG. 2. The bead 8 is a tubular gas channel or tube that is inflated by the gas generator. The bead 8 generates a plate or bowl shape for the planar side airbag 2, thereby preventing the head 9 of the vehicle passenger from slipping out. In addition, the continuous, tubular bead 8 improves the retention function relative to the head 9 and upper thorax or shoulder area.

The top view on FIG. 3 shows a diagrammatically simplified side cross sectional view according to FIG. 2. The planar designed side airbag 2 abuts the side window 4 of the vehicle structure 3 depicted on FIG. 1 with at least four continuous support surfaces 21, 22, 23, 24. On the outside, the continuous bead 8 forms a respective continuous support for the side airbag 2 on the side window 4. Viewed from the top, the side airbag 2 has the shape of a long stretched-out W. The leg ends each have supports with the other support surfaces 21, 24 abutting the side window 4 in the form of the bead 8 on both sides.

The middle area of the side airbag 2, which constitutes a main position for a normal head position of a 50% dummy, is thickened and projects from the surface of the side window 4. This provides an additional buffer zone. During its deployment, the side airbag 2 assumes the shape depicted on FIG. 3, as the result of corresponding stitches and weaves or Jacquard, desiccation or other measures known from prior art. The side airbag 2 abuts the wide window 4 over a large surface in intermediate areas between the middle and outer edge with the support surfaces 22, 23. The side airbag 2 is spaced apart from the side window 4 of the vehicle structure 3 in front of the continuous tubular bead 8. FIG. 3 shows the large head area that is encompassed by the side airbag 2 in position V and VI, with the head bent forward V and backward VI.

FIG. 4 shows a first sample of the side airbag 2 with a tubular continuous bead 8 and an inflation channel 10 arranged from below. As shown on FIG. 3, a central area 11 inwardly curved into the passenger compartment is given a planar design by the corresponding stitching in the side airbag 2. The central area 11 is also somewhat thickened, and can hence accommodate more air. The gas streaming into the side airbag 2 is distributed through a cross-channel system comprised of two pipe crosses from and to the tubular bead 8 formed in the outer contour. A second pipe cross is offset by approx. 45 degrees relative to the first pipe cross. Both cross each other in the central area 11 in the form of gas channels or gas hoses. The tubular gas channels 13, 14, 15, 16 depicted on FIG. 5 permit a larger throughput of gas, while areas 12 lying in between exhibit a smaller thickness, are filled with less gas, and form spaced apart from the vehicle structure 3 during the deployment process.

FIG. 5 shows an alternative embodiment to FIG. 4. On FIG. 5, there are three channels 13, 15, 16 branching from the inflation channel 10, which extends toward the opposing peripheral edge of the side airbag 2. A central gas channel 14 spans over parallel to the upper outer contour of the side airbag 2. The central gas channel 14 is at the height of a path of motion for the head of a so-called 50% dummy.

FIG. 6 shows a side airbag 2 with a fan-like structure and an enveloping, oval-shaped outer bead 8. The oval shape is created by an expanded gas channel 15 slightly offset in the middle, which takes the form of an extension of the inflation channel 10. Three horizontally arranged, inflating gas channels 13, 14, 16 with a smaller cross section are formed in the side airbag, perpendicular to the gas channel 15. Situated in between the latter are areas 12 with a smaller thickness projecting away from the side window 4.

FIG. 7 shows a special embodiment of the side airbag 2 with the continuous tubular bead 8 and cross-shaped gas channels 14, 15, along with continuous beads 17, 18 that are parallel to an oval shape and taper toward the middle. In this special embodiment, the central area 11 is elongated, smaller in design and only connected with the vertical gas channel 15. Of course, the area 11 can also be connected with the horizontal gas channel 14. It goes without saying that a plurality of other configurations and combinations of the gas channels 13 to 18 depicted on FIG. 4 to FIG. 7 are realizable and obvious to the expert. The side airbag system 1 provides a cost-effective, enlarged area of protection for smaller and larger people, who assume both normal positions, and positions in which they lean forward or backward. The side airbag system 1 is suited as a cost-effective variant that saves on installation space, both in semi-convertibles and closed-body vehicles with a fixed roof.

Reference is made in particular to the graphic depiction of all figures as being essential to the invention. The drawings show only diagrammatic views that are not to scale. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A side airbag system, comprising:
   a side airbag for protecting an upper thorax and a head area of a vehicle passenger between a lateral vehicle structure and the vehicle passenger; and
   a gas generator that is fluidically connected with the side airbag,
   wherein the side airbag is planar in the deployed condition, and protectively covers a path of motion for the head area, along with various seated positions for a small passenger and a large vehicle passenger,
   wherein the side airbag, viewed from the lateral vehicle structure, has an outer contour with an essentially continuous bead, and the side airbag is shaped like an M viewed from a top in a cross section.

2. The side airbag system according to claim 1, wherein the side airbag is shaped like a plate toward the passenger compartment.

3. The side airbag system according to claim 1, wherein the side airbag is corrugated viewed from a top and in a cross section.

4. The side airbag system according to claim 1, wherein the side airbag is designed like a large egg on a side, with a side inflation channel, and that the side airbag protects the head area with the vehicle passenger seated in a normal, forwardly bent and backwardly bent positions.

5. The side airbag system according to claim 1, wherein the side airbag has inflatable, tubular gas channels.

6. The side airbag system according to claim 1, wherein the side airbag is designed in such a way as to at least partially protect the upper thorax area of the vehicle passenger in addition to the head area.

7. The side airbag system according to claim 1, wherein the side airbag system can be mounted on the A, B or C-column.

8. The side airbag system according to claim 1, wherein the side airbag system can be mounted on a roof structure.

9. The side airbag system according to claim 1, wherein the side airbag can be mounted on a window parapet in an interior door paneling of a vehicle door.

10. The side airbag system according to claim 1, wherein the side airbag system can be mounted in a backrest of a vehicle seat.

11. The side airbag system according to claim 1, wherein the side airbag system can be mounted in a headrest.

12. The side airbag system according to claim 1, wherein the side airbag is provided with an essentially constant thickness in a central region.

13. The side airbag system according to claim 1, wherein the side airbag system is designed as a soft cover variant.

14. The side airbag system according to claim 1, wherein the side airbag includes a bowl like shape towards the passenger compartment.

15. The side airbag system according to claim 1, wherein the side airbag is designed like a potato lying on a side, with a side inflation channel and that the side airbag protects the head area with the vehicle passenger seated in a normal, forwardly bent and backwardly bent positions.

16. A side airbag system, comprising:
- a side airbag for protecting an upper thorax and a head area of a vehicle passenger between a lateral vehicle structure and the vehicle passenger; and
- a gas generator that is fluidically connected with the side airbag,
- wherein the side airbag is planar in the deployed condition, and protectively covers a path of motion for the head area, along with various seated positions for a small passenger and a large vehicle passenger,
- wherein the side airbag, viewed from the lateral vehicle structure, has an outer contour with an essentially continuous bead, and the side airbag is shaped like a W viewed from a top in a cross section.

* * * * *